United States Patent [19]
Ponzo

[11] Patent Number: 4,530,182
[45] Date of Patent: Jul. 23, 1985

[54] CRAB TRAP

[76] Inventor: Charles Ponzo, 12 Abby La., Shirley, N.Y. 11967

[21] Appl. No.: 560,912

[22] Filed: Dec. 13, 1983

[51] Int. Cl.³ ............................................. A01K 69/06
[52] U.S. Cl. ....................................... 43/102; 43/105
[58] Field of Search .......................... 43/102, 105, 100

[56] References Cited

U.S. PATENT DOCUMENTS

| | | | |
|---|---|---|---|
| 3,508,358 | 4/1970 | Lee | 43/105 |
| 3,867,782 | 2/1975 | Ortiz | 43/105 |
| 3,908,301 | 9/1975 | Ortiz | 43/105 |
| 4,030,232 | 6/1977 | Niva | 43/105 |
| 4,044,493 | 8/1977 | Fox | 43/105 |
| 4,134,226 | 1/1979 | Petrella | 43/102 |
| 4,156,984 | 6/1979 | Kinser | 43/105 |
| 4,237,645 | 12/1980 | Kinser | 43/105 |

Primary Examiner—Gene P. Crosby
Attorney, Agent, or Firm—Michael I. Kroll

[57] ABSTRACT

A crab trap is provided and consists of a plurality of guide members coupling a flange of a top portion of a perforated enclosure to a base member and plurality of buoyant doors, each of which are slideably supported on two guide members. When the crab trap is submerged within water the doors will float up to the flange of the top portion opening the crab trap allowing a crab to enter. A flexible hoist line is connected to each corner of the top portion of the enclosure. When the crab trap is pulled up the water acting on the top of the door surface will push down the doors and thus the crabs are entrapped within the crab trap.

7 Claims, 3 Drawing Figures

CRAB TRAP

BACKGROUND OF THE INVENTION

1. Field of Invention

The instant invention relates generally to crab traps and more specifically it relates to a crab trap having buoyant doors that float to an open position allowing a crab to enter therein.

2. Description of the Prior Art

Numerous apparatuses have been provided in prior art that are adapted to trap submarine crustaceans. For example U.S. Pat. Nos. 3,867,782; 4,030,232 and 4,044,493 all are illustrative of such prior art. While these units may be suitable for the particular purpose to which they address, they would not be suitable for the purposes of the present invention as heretofore described.

SUMMARY OF THE INVENTION

A principle object of the present invention is to provide a crab trap that has buoyant doors so that when the crab trap is submerged within water the doors will float up opening the crab trap allowing a crab to enter.

Another object is to provide a crab trap that has a flexible hoist line so that when the crab trap is pulled up force of the water will push down the doors closing the crab trap entrapping the crab within.

An additional object is to provide a crab trap that has buoyant doors that contain hollow air tight chambers and fabricated from material that will float in water.

A further object is to provide a crab trap that is simple and easy to use.

A still further object is to provide a crab trap that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
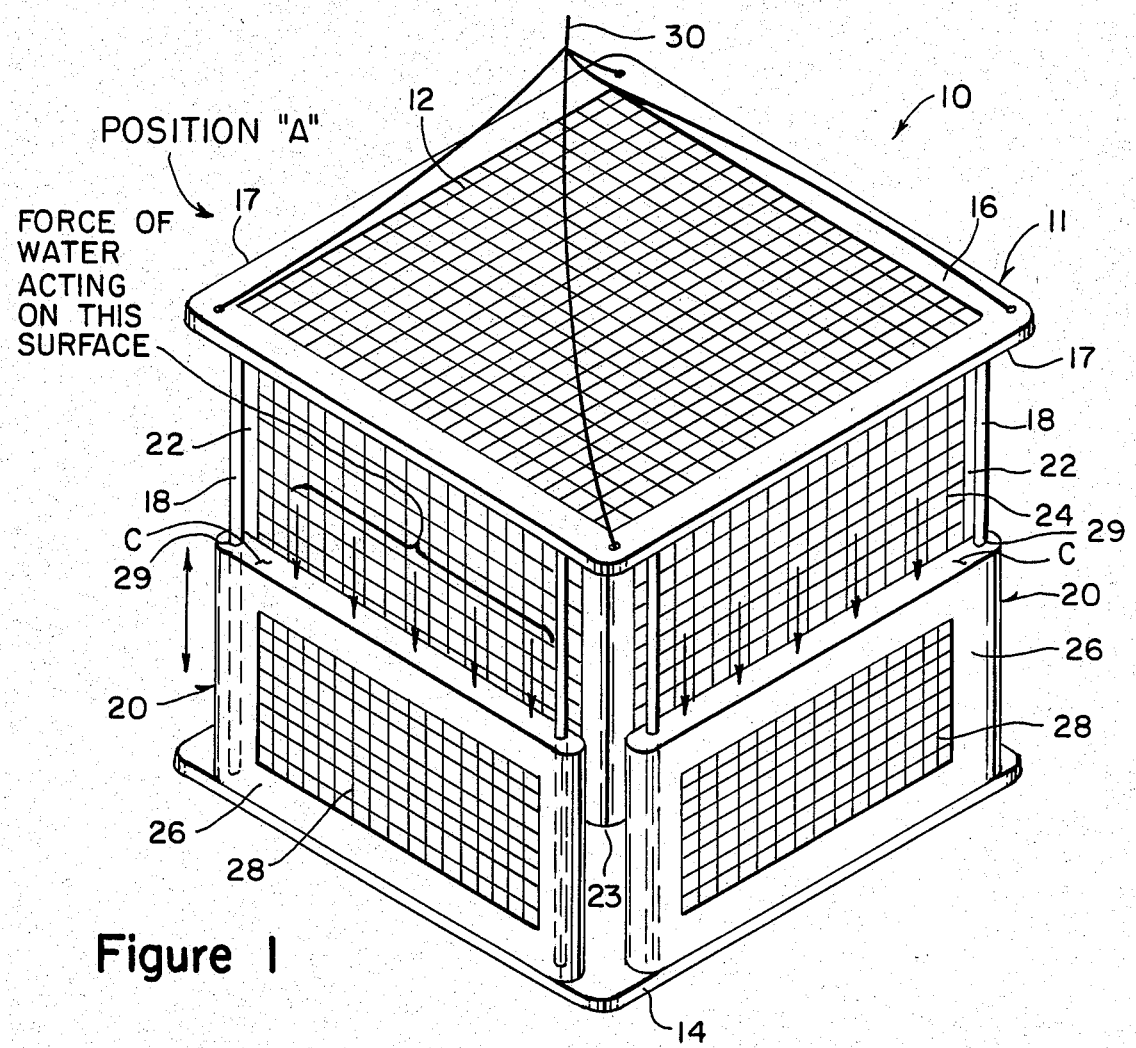
FIG. 1 is a perspective view of the invention in a closed position.
Figure 2:
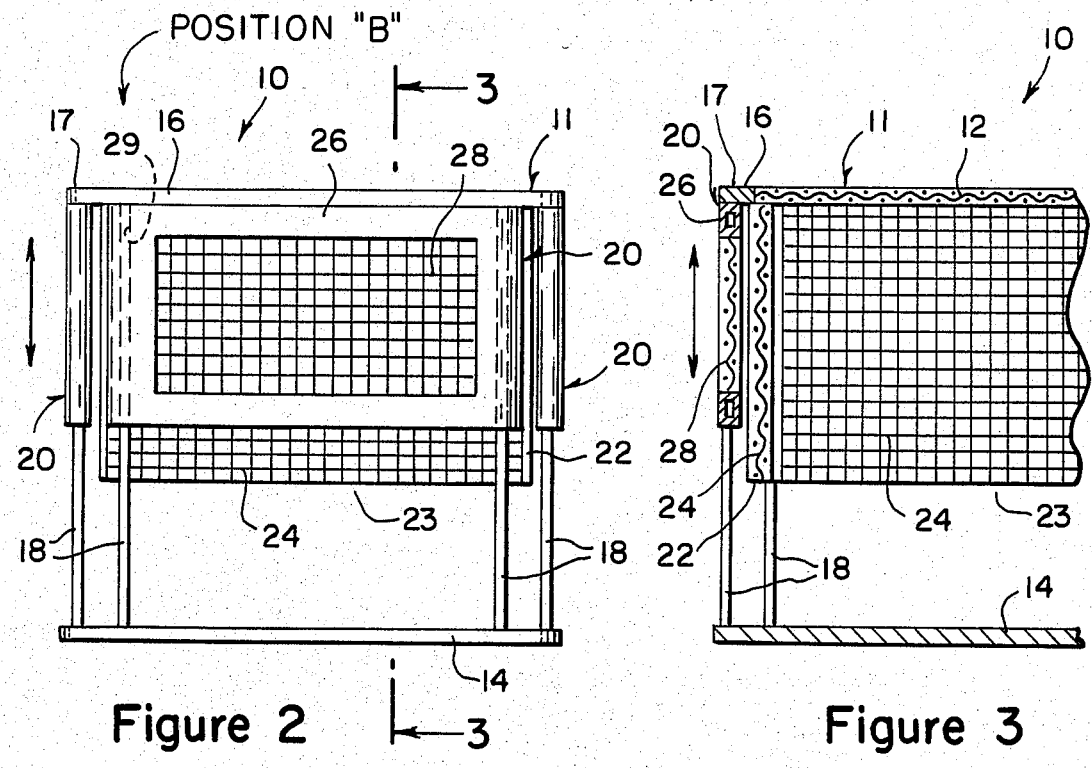
FIG. 2 is an elevational view illustrating the invention when submerged in an open position.
Figure 3:
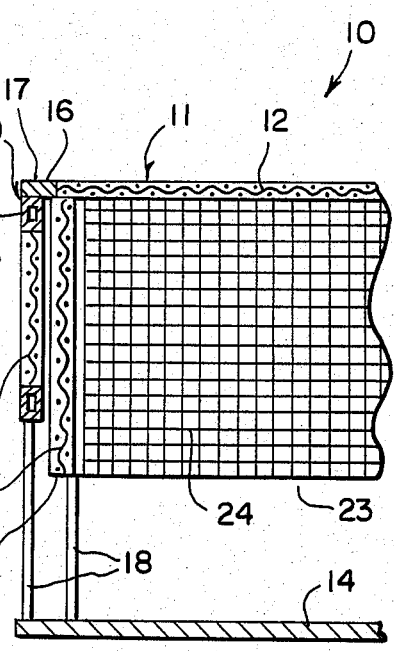
FIG. 3 is a cross sectional view, with parts broken away, taken along line 3—3 in FIG. 2.

Turning now descriptively to the drawings, in which similar reference characters denote similar elements throughout the several views, FIGS. 1 through 3 illustrates a crab trap 10 that consists of a base member 14, a perforated enclosure 11, eight guide members 18, four buoyant doors 20 and a flexible hoist line 30.

The enclosure 11 has four stationary vertical panels 22 forming an open bottom 23 and a top portion 16. Each panel 22 has a perforated surface 24 such as wire, mesh, a grid, holes, etc. The top portion has a continuous flange 17 extending outwardly from the enclosure 11. The top portion 16 is of size and shape substantially identical to the base member 14 except that it has a perforated surface 12.

The guide members 18 couple the flange 17 of the top portion 16 to the base member 14 such that the top portion of the enclosure 11 is parallel to the base member.

Each door 20 contains a perforated portion 28, such as wire, mesh, a grid, holes, etc., and is slideably supported on two guide members 18 spaced parallel apart. Distance between the open bottom 23 of the enclosure 11 and the base member 14 is less than height of the doors 20. When the crab trap 10 is submerged within water the doors will float up to the flange 17 of the top portion 16 as shown in position "B" in FIG. 2, opening the crab trap allowing a crab to enter.

The flexible hoist line 30 is connected at each end to a corner of the top portion 16 of the enclosure 11. When the crab trap 10 is pulled up force of the water will push down the doors 20, at surface C, as shown in position "A" in FIG. 1, closing the crab trap entrapping the crab within.

Each buoyant door 20 contains a hollow air tight chamber 26 as illustrated. The doors can also be fabricated from a material that will float in the water such as wood or plastic foam. Each door has a pair of spaced apart vertical apertures 29 therethrough. Each guide member 18 is a shaft that engages one aperture 29 in the buoyant door.

To use the crab trap 10 simply place it into the water. Its overall weight and perforated portions will allow it to sink to the bottom. The doors 20 being buoyant will float up to the flange 17, opening the trap so that the crab is attracted to the bait placed within said crab trap. When hoist line 30 is pulled up the force of the water on surface C, which is positioned on top of the door, will push down the doors closing the doors entrapping the crab inside.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A crab trap which comprises:
    (a) a base member;
    (b) a perforated enclosure having an open bottom and a top portion, said top portion having a continuous flange extending outwardly from said enclosure, said top portion being of size and shape substantially identical to said base member;
    (c) a plurality of guide members coupling said flange of said top portion to said base member such that said top portion of said enclosure is parallel to said base member;
    (d) a plurality of buoyant doors, each said door slideably supported on two said guide members spaced parallel apart, distance between said open bottom of said enclosure and said base member being less than height of said doors so that when said crab trap is submerged within water said doors will float up to said flange of said top portion, opening said crab trap allowing a crab to enter; and
    (e) a flexible hoist line connected at each end to a corner of said top portion of said enclosure so that when said crab trap is pulled up force of said water will push down said doors closing said crab trap entrapping said crab within.

2. A crab trap as recited in claim 1, wherein each said buoyant door further contains a perforated portion.

3. A crab trap as recited in claim 2, wherein each said buoyant door contains a hollow air tight chamber.

4. A crab trap as recited in claim 2, wherein each said buoyant door is fabricated from a material that will float in the water.

5. A crab trap as recited in claim 4, wherein the material for said bouyant door is wood.

6. A crab trap as recited in claim 4, wherein the material for said bouyant door is bouyant plastic.

7. A crab trap as recited in claim 2, comprises:
(a) each said buoyant door having a pair of spaced apart vertical apertures therethrough; and
(b) each said guide member being a shaft that engages one said aperture in said buoyant door.

* * * * *